United States Patent [19]
Cissell

[11] Patent Number: 5,951,092
[45] Date of Patent: Sep. 14, 1999

[54] FABRIC TRUCK BED COVER WITH VARIABLY EXTENDABLE SUPPORT FRAME

[76] Inventor: Joseph Cissell, 450 Froman Greenwell La., Bardstown, Ky. 40004

[21] Appl. No.: 09/251,865

[22] Filed: Feb. 17, 1999

[51] Int. Cl.$^6$ .................................................. B60P 7/02
[52] U.S. Cl. .............................. 296/100.12; 296/100.17; 296/100.18
[58] Field of Search ......................... 296/100.12, 100.17, 296/100.18

[56] References Cited

U.S. PATENT DOCUMENTS

| | | | |
|---|---|---|---|
| 4,285,539 | 8/1981 | Cole | 296/100.12 |
| 4,289,346 | 9/1981 | Bourgeois | 296/100.12 |
| 4,721,336 | 1/1988 | Jones | 292/100.12 |
| 4,789,196 | 12/1988 | Fields | 296/100 |
| 4,964,669 | 10/1990 | Geier | 296/108 |
| 5,005,896 | 4/1991 | Li | 296/100 |
| 5,056,855 | 10/1991 | Moravsky | 296/98 |
| 5,186,513 | 2/1993 | Strother | 296/100 |
| 5,353,826 | 10/1994 | Davis, Sr. | 135/88 |
| 5,769,482 | 6/1998 | Kirk | 296/100.18 |
| 5,845,957 | 12/1998 | Hurst | 296/100.12 |

FOREIGN PATENT DOCUMENTS 213990  3/1957  Australia ........................... 296/100.12

*Primary Examiner*—Gary C. Hoge
*Attorney, Agent, or Firm*—Joseph N. Breaux

[57] ABSTRACT

A fabric truck bed cover secured to a variably extendable support frame that is attachable to the sidewalls and passenger cabin of a truck. The variably extendable support frame includes left and right support bow trackways, a truck cab securable stationary support bow extending between the left and right support bow trackways, a plurality of identical slidable support bows slidably mounted in connection with the left and right support bow trackways, and a number of position locking pins.

1 Claim, 2 Drawing Sheets

5,951,092

FABRIC TRUCK BED COVER WITH VARIABLY EXTENDABLE SUPPORT FRAME

TECHNICAL FIELD

The present invention relates to truck bed covers and more particularly to a fabric truck bed cover with a variably extendable support frame that includes a fabric truck bed cover secured to a variably extendable support frame that is attachable to the sidewalls and passenger cabin of a truck; the variably extendable support frame including left and right support bow trackways, a truck cab securable stationary support bow extending between the left and right support bow trackways, a plurality of identical slidable support bows slidably mounted in connection with the left and right support bow trackways, and a number of position locking pins; the left and right support bow trackways each including a center slot defining an interior upper trackway side and an exterior upper trackway side, a rectangular shaped passageway formed along the length thereof in connection with the center slot, and a number of spaced truck bed sidewall securing plates extending downward from an interior facing side of each of the support bow trackways, each sidewall securing plate having an aperture provided therethrough for passage of a truck bed securing bolt; the truck cab securable, stationary support bow including a rigid U-shaped cover support member having two parallel sections, each provided with a truck cab securing screw aperture through which a truck cab securing screw is positionable to attach the U-shaped cover support member to the cab of a truck during installation; each of the plurality of identical slidable support bows including a rigid U-shaped cover support member having opposed parallel sections and left and right slide assemblies that are slidably entrapped within, respectively, the left and right support bow trackways; each slide assembly including a rectangular box shaped slide member and a locking fitting; the slide member being slidably entrapped within the rectangular shaped passageway formed along the length of the support bow trackway and having a support bow attachment section extending upwardly from a center top surface of the slide member and slidably positioned through the center slot of the support bow trackway into connection with an end of one of the opposed parallel sections of the U-shaped cover support member; the locking fitting being attached to the support bow attachment section and extending over the interior upper trackway side; the locking fitting having a fitting locking aperture provided therethrough that is alignable individually with each of the spaced bow locking apertures of the support bow trackway and securable in fixed relationship therewith by inserting therein one of the number of position locking pins; the fabric truck bed cover including a bed cover portion and a back flap extending from a center back edge of the bed cover portion; the bed cover portion having a second plurality of separate support bow receiving sleeves, one of the plurality of separate support bow receiving sleeves having a portion of one of the U-shaped support members of the plurality of identical slidable support bows and the stationary support bow positioned therein to secure the fabric truck bed cover to the variably extendable support frame.

BACKGROUND ART

It is often desirable to provide a cover the truck bed of a pickup truck for shielding the contents of the truck bed from wind, rain, and the like. Because it could desirable to cover only a portion of the truck bed when requiring an uncovered portion for carrying items that are too large to fit beneath the truck bed cover, it would be a benefit to have a truck bed cover that was variably extendable to cover a user selected portion of the truck bed.

GENERAL SUMMARY DISCUSSION OF INVENTION

It is thus an object of the invention to provide a fabric truck bed cover with a variably extendable support frame.

It is a further object of the invention to provide a fabric truck bed cover with a variably extendable support frame that includes a fabric truck bed cover secured to a variably extendable support frame that is attachable to the sidewalls and passenger cabin of a truck; the variably extendable support frame including left and right support bow trackways, a truck cab securable stationary support bow extending between the left and right support bow trackways, a plurality of identical slidable support bows slidably mounted in connection with the left and right support bow trackways, and a number of position locking pins; the left and right support bow trackways each including a center slot defining an interior upper trackway side and an exterior upper trackway side, a rectangular shaped passageway formed along the length thereof in connection with the center slot, and a number of spaced truck bed sidewall securing plates extending downward from an interior facing side of each of the support bow trackways, each sidewall securing plate having an aperture provided therethrough for passage of a truck bed securing bolt; the truck cab securable, stationary support bow including a rigid U-shaped cover support member having two parallel sections, each provided with a truck cab securing screw aperture through which a truck cab securing screw is positionable to attach the U-shaped cover support member to the cab of a truck during installation; each of the plurality of identical slidable support bows including a rigid U-shaped cover support member having opposed parallel sections and left and right slide assemblies that are slidably entrapped within, respectively, the left and right support bow trackways; each slide assembly including a rectangular box shaped slide member and a locking fitting; the slide member being slidably entrapped within the rectangular shaped passageway formed along the length of the support bow trackway and having a support bow attachment section extending upwardly from a center top surface of the slide member and slidably positioned through the center slot of the support bow trackway into connection with an end of one of the opposed parallel sections of the U-shaped cover support member; the locking fitting being attached to the support bow attachment section and extending over the interior upper trackway side; the locking fitting having a fitting locking aperture provided therethrough that is alignable individually with each of the spaced bow locking apertures of the support bow trackway and securable in fixed relationship therewith by inserting therein one of the number of position locking pins; the fabric truck bed cover including a bed cover portion and a back flap extending from a center back edge of the bed cover portion; the bed cover portion having a second plurality of separate support bow receiving sleeves, one of the plurality of separate support bow receiving sleeves having a portion of one of the U-shaped support members of the plurality of identical slidable support bows and the stationary support bow positioned therein to secure the fabric truck bed cover to the variably extendable support frame.

It is a still further object of the invention to provide a fabric truck bed cover with a variably extendable support frame that accomplishes all or some of the above objects in combination.

Accordingly, a fabric truck bed cover with a variably extendable support frame is provided. The fabric truck bed cover with a variably extendable support frame includes a fabric truck bed cover secured to a variably extendable support frame that is attachable to the sidewalls and passenger cabin of a truck; the variably extendable support frame including left and right support bow trackways, a truck cab securable stationary support bow extending between the left and right support bow trackways, a plurality of identical slidable support bows slidably mounted in connection with the left and right support bow trackways, and a number of position locking pins; the left and right support bow trackways each including a center slot defining an interior upper trackway side and an exterior upper trackway side, a rectangular shaped passageway formed along the length thereof in connection with the center slot, and a number of spaced truck bed sidewall securing plates extending downward from an interior facing side of each of the support bow trackways, each sidewall securing plate having an aperture provided therethrough for passage of a truck bed securing bolt; the truck cab securable, stationary support bow including a rigid U-shaped cover support member having two parallel sections, each provided with a truck cab securing screw aperture through which a truck cab securing screw is positionable to attach the U-shaped cover support member to the cab of a truck during installation; each of the plurality of identical slidable support bows including a rigid U-shaped cover support member having opposed parallel sections and left and right slide assemblies that are slidably entrapped within, respectively, the left and right support bow trackways; each slide assembly including a rectangular box shaped slide member and a locking fitting; the slide member being slidably entrapped within the rectangular shaped passageway formed along the length of the support bow trackway and having a support bow attachment section extending upwardly from a center top surface of the slide member and slidably positioned through the center slot of the support bow trackway into connection with an end of one of the opposed parallel sections of the U-shaped cover support member; the locking fitting being attached to the support bow attachment section and extending over the interior upper trackway side; the locking fitting having a fitting locking aperture provided therethrough that is alignable individually with each of the spaced bow locking apertures of the support bow trackway and securable in fixed relationship therewith by inserting therein one of the number of position locking pins; the fabric truck bed cover including a bed cover portion and a back flap extending from a center back edge of the bed cover portion; the bed cover portion having a second plurality of separate support bow receiving sleeves, one of the plurality of separate support bow receiving sleeves having a portion of one of the U-shaped support members of the plurality of identical slidable support bows and the stationary support bow positioned therein to secure the fabric truck bed cover to the variably extendable support frame.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
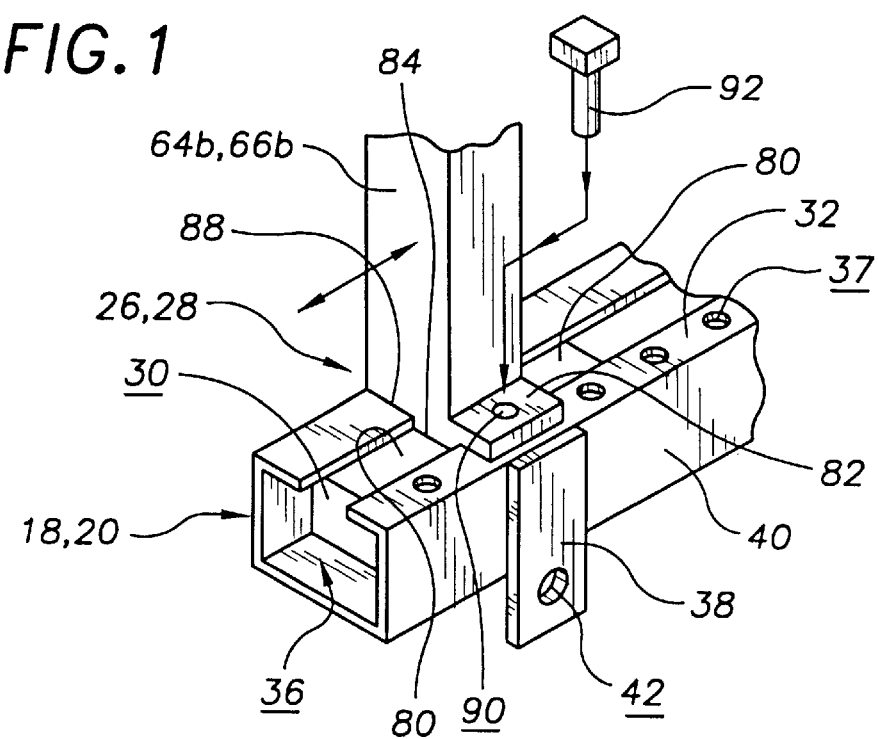
FIG. 1 is a perspective view showing an exemplary embodiment of the fabric truck bed cover with variably extendable support frame of the present invention installed on a representative truck with the variably extendable support frame (shown in dashed lines) fully extended and supporting the fabric truck bed cover over the bed of the representative truck.

FIG. 1 shows an exemplary embodiment of the fabric truck bed cover with variably extendable support frame of the present invention generally designated 10, installed on a representative pickup truck, generally designated 12. Truck bed cover 10 includes a variably extendable support frame, generally designated 14 (shown in dashed lines), fully extended and supporting a heavy weight canvas fabric truck bed cover, generally designated 16, over the bed of representative pickup truck 12. Fabric truck bed cover 16 includes a bed cover portion 17 and a back flap 19 extending from a center back edge 21 of bed cover portion 17. Back flap 19 includes a clear plastic window 23. Bed cover portion 17 is secured to variable extendable support frame 14.

Figure 2:
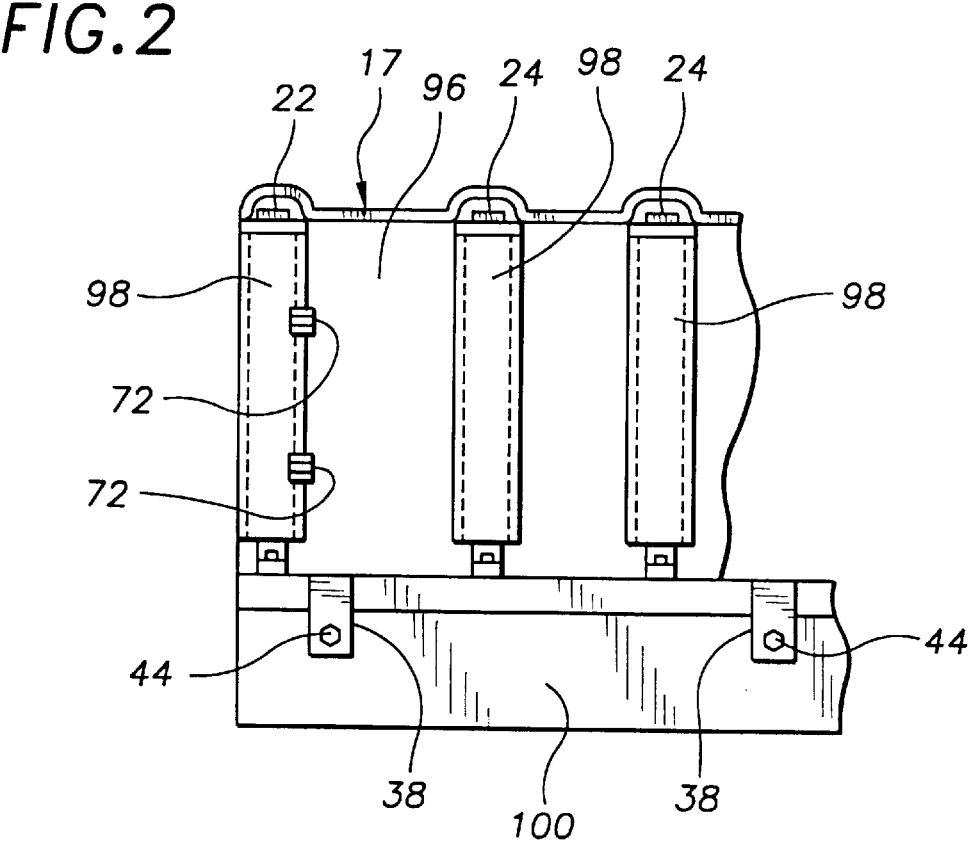
FIG. 2 is a partial perspective view of the variably extendable support frame showing the left and right support bow trackways each including spaced bow locking apertures along the length thereof; the truck cab securable, stationary support bow extending between the left and right support bow trackways and including the four truck cab securing screws; two of the six identical slidable support bows each with left and right slide assemblies slidably entrapped within, respectively, the left and right support bow trackways; each slide assembly including a locking pin assembly including a locking fitting having a fitting locking aperture provided therethrough that is alignable individually with each of the spaced bow locking apertures of the support bow trackway along which its respective slide assembly is slidable and is securable in fixed relationship therewith by a position locking pin; and two of the spaced truck bed sidewall securing plates extending downward from the interior facing side of each of the support bow trackways, each sidewall securing plate having an aperture provided therethrough for passage of a truck bed securing bolt.

FIG. 2 shows a portion of the variably extendable support frame 14 including left and right support bow trackways, generally designated 18,20; a truck cab securable, stationary support bow, generally designated 22; and two of the six identical slidable support bows, each generally designated 24. Left and right support bow trackways 18,20 are mirror images of each other and each include a center slot 30 defining an interior upper trackway side 32 and an exterior upper trackway side 34, a rectangular shaped passageway 36 (see FIG. 3) formed along the length thereof in connection with center slot 30, and a number of spaced truck bed sidewall securing plates 38 extending downward from an interior facing side 40 of each of support bow trackway 18,20. Interior upper trackway side 32 is provided with spaced position locking apertures 37 along the length thereof. Each sidewall securing plate 38 has an aperture 42 provided therethrough for passage of a truck bed securing bolt 44.

Truck cab securable, stationary support bow 22 includes a rigid U-shaped cover support member 60a having two opposed parallel vertical sections 64a,66a, that are connected by a horizontal section 62a. Each parallel vertical section 64a,66a is provided with two truck cab securing screw apertures 70 through which a truck cab securing screw 72 is positionable to attach U-shaped cover support member 60a to the cab of pickup truck 12 (FIG. 1) during installation.

Each slidable support bow 24 is of metal construction and includes a rigid U-shaped support member 60b and mirror image left and right slide assemblies, generally designated 26,28, slidably entrapped within, respectively, left and right support bow trackways 18,20. U-shaped support member 60b includes a horizontal member 62b connecting two opposed parallel vertical sections 64b,66b. Left and right slide assemblies 26,28 are in rigid connection, respectively with the ends of opposed parallel vertical sections 64b,66b.

Figure 3:
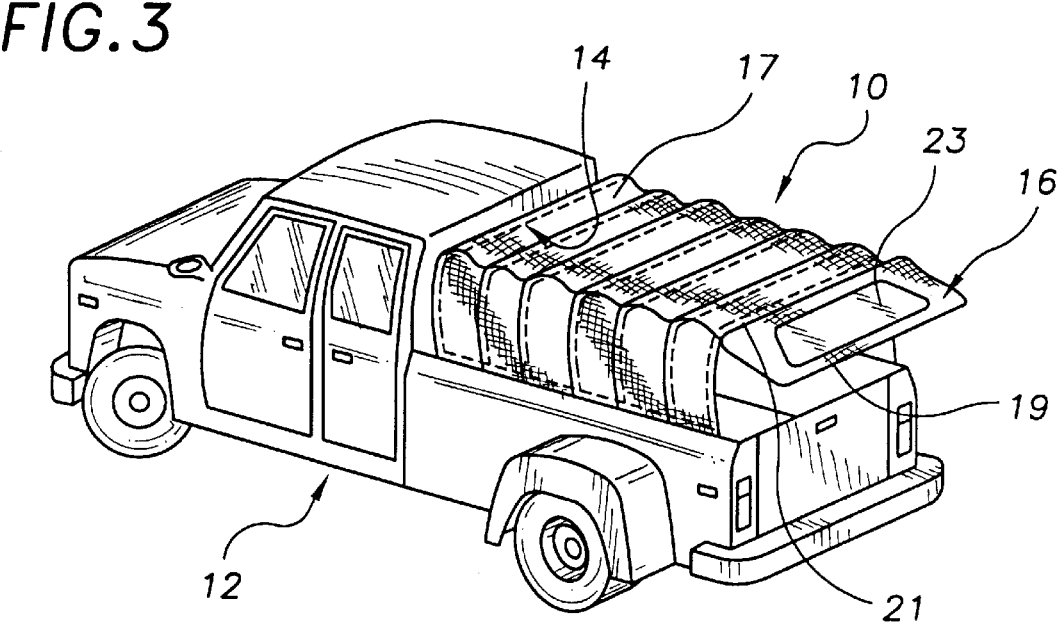
FIG. 3 is a detail, partial perspective view of a section of one of the support bow trackways and one of the slide assemblies slidably entrapped therealong; the support bow trackway including a center slot defining an interior upper trackway side and an exterior upper trackway side, the interior upper trackway side having spaced bow locking apertures formed therethrough along the length thereof; the slide assembly including a rectangular box shaped slide member and a locking fitting, the slide member being slidably entrapped within a rectangular shaped passageway formed along the length of the support bow trackway and having a support bow attachment section extending upwardly from a top surface thereof and slidably positioned through the center slot of the support bow trackway, the locking fitting being attached to the support bow attachment section and extending over the interior upper trackway side; the locking fitting having a fitting locking aperture provided therethrough that is alignable individually with each of the spaced bow locking apertures of the support bow trackway and securable in fixed relationship therewith by a user insertable position locking pin.

With reference to FIG. 3, each slide assembly 26,28 includes a rectangular box shaped slide member 80 and a locking fitting 82. Slide member 80 is slidably entrapped within rectangular shaped passageway 36 and has a support bow attachment section 84 extending upwardly from a center top surface of slide member 80 and slidably positioned through the center slot 30 of support bow trackway 18,20 into connection with an end 88 of one of an opposed parallel section 64b,66b.

Locking fitting 82 is attached to support bow attachment section 84 and extends over interior upper trackway side 32. A fitting locking aperture 90 is provided therethrough that is alignable individually with each of the spaced position locking apertures 37. Position locking is accomplished by inserting a position locking pin 92 through the aligned fitting locking aperture 90 and the selected position locking aperture 37 to secure each slide assembly 26,28 in fixed relation to trackway 18,20.

Figure 4:
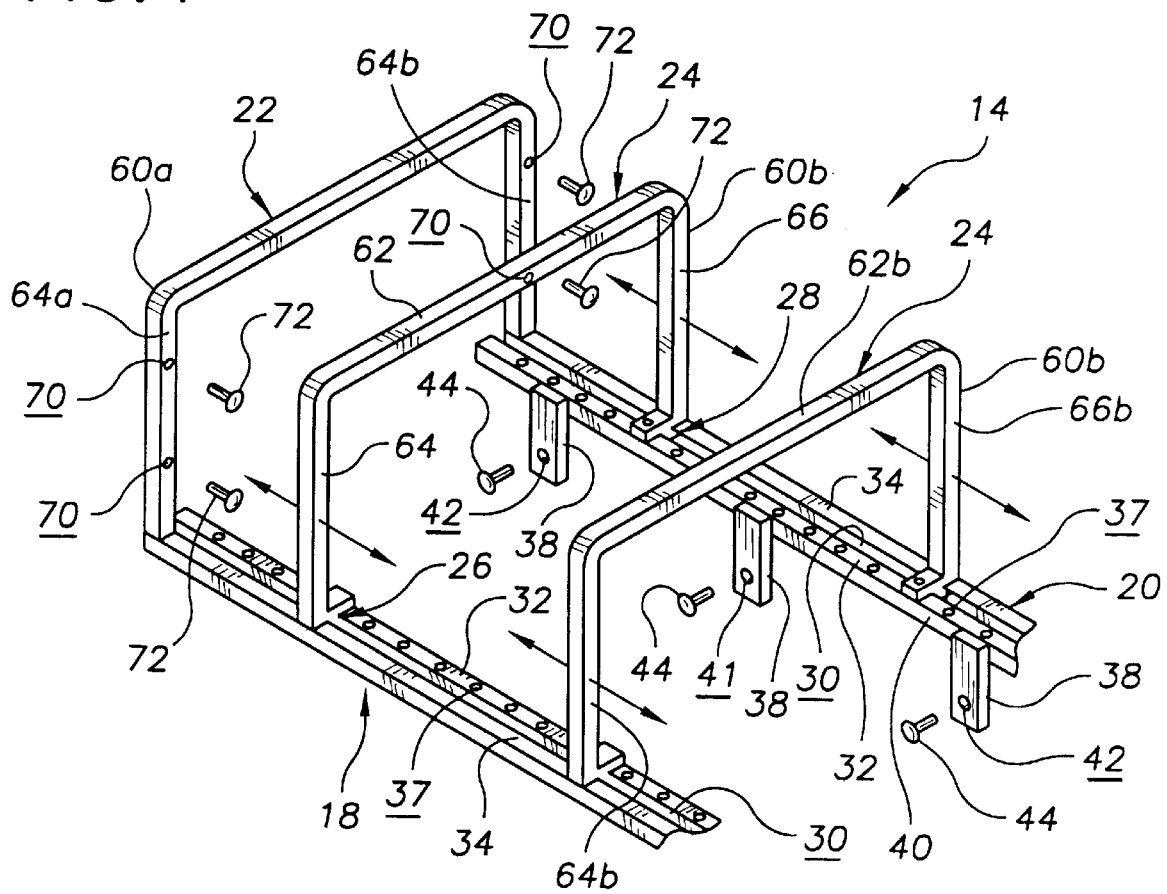
FIG. 4 is a cutaway interior plan view of a section of the fabric truck bed cover showing portions of three of the bed cover attachment sleeves two with a section of one of the six identical slidable support bows positioned therethrough and one with a section of the truck cab securable, stationary support bow positioned therethrough.

FIG. 4 shows a section of the interior 96 of fabric bed cover portion 17 showing three of the seven bed cover attachment sleeves; two with a section of one of the six identical slidable support bows 24 positioned therethrough and one with a section of the truck cab securable, stationary support bow 22 positioned therethrough securing fabric bed cover portion 17 to variably extendable support frame 14 (FIGS. 1 and 2). FIG. 4 also shows two of the sidewall securing plates 38 secured to the interior truck bed sidewall 100 of pickup truck 12 (FIG. 1) with truck bed securing bolts 44.

It can be seen from the preceding description that a fabric truck bed cover with a variably extendable support frame has been provided that includes a fabric truck bed cover secured to a variably extendable support frame that is attachable to the sidewalls and passenger cabin of a truck; the variably extendable support frame including left and right support bow trackways, a truck cab securable stationary support bow extending between the left and right support bow trackways, a plurality of identical slidable support bows slidably mounted in connection with the left and right support bow trackways, and a number of position locking pins; the left and right support bow trackways each including a center slot defining an interior upper trackway side and an exterior upper trackway side, a rectangular shaped passageway formed along the length thereof in connection with the center slot, and a number of spaced truck bed sidewall securing plates extending downward from an interior facing side of each of the support bow trackways, each sidewall securing plate having an aperture provided therethrough for passage of a truck bed securing bolt; the truck cab securable, stationary support bow including a rigid U-shaped cover support member having two parallel sections, each provided with a truck cab securing screw aperture through which a truck cab securing screw is positionable to attach the U-shaped cover support member to the cab of a truck during installation; each of the plurality of identical slidable support bows including a rigid U-shaped cover support member having opposed parallel sections and left and right slide assemblies that are slidably entrapped within, respectively, the left and right support bow trackways; each slide assembly including a rectangular box shaped slide member and a locking fitting; the slide member being slidably entrapped within the rectangular shaped passageway formed along the length of the support bow trackway and having a support bow attachment section extending upwardly from a center top surface of the slide member and slidably positioned through the center slot of the support bow trackway into connection with an end of one of the opposed parallel sections of the U-shaped cover support member; the locking fitting being attached to the support bow attachment section and extending over the interior upper trackway side; the locking fitting having a fitting locking aperture provided therethrough that is alignable individually with each of the spaced bow locking apertures of the support bow trackway and securable in fixed relationship therewith by inserting therein one of the number of position locking pins; the fabric truck bed cover including a bed cover portion and a back flap extending from a center back edge of the bed cover portion; the bed cover portion having a second plurality of separate support bow receiving sleeves, one of the plurality of separate support bow receiving sleeves having a portion of one of the U-shaped support members of the plurality of identical slidable support bows and the stationary support bow positioned therein to secure the fabric truck bed cover to the variably extendable support frame.

It is noted that the embodiment of the fabric truck bed cover with a variably extendable support frame described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fabric truck bed cover with variably extendable support frame comprising:

a variably extendable support frame that is attachable to the sidewalls and passenger cabin of a truck; and a fabric truck bed cover secured to said variably extendable support frame;

said variably extendable support frame including left and right support bow trackways, a truck cab securable stationary support bow extending between said left and right support bow trackways, a plurality of identical slidable support bows slidably mounted in connection with said left and right support bow trackways, and a number of position locking pins;

said left and right support bow trackways each including a center slot defining an interior upper trackway side and an exterior upper trackway side, a rectangular shaped passageway formed along the length thereof in connection with said center slot, and a number of spaced truck bed sidewall securing plates extending downward from an interior facing side of each of said support bow trackways, each sidewall securing plate having an aperture provided therethrough for passage of a truck bed securing bolt;

said truck cab securable, stationary support bow including a rigid U-shaped cover support member having two parallel sections, each provided with a truck cab securing screw aperture through which a truck cab securing screw is positionable to attach said U-shaped cover support member to said cab of a truck during installation;

each of said plurality of identical slidable support bows including a rigid U-shaped cover support member having opposed parallel sections and left and right slide assemblies that are slidably entrapped within, respectively, said left and right support bow trackways;

each slide assembly including a rectangular box shaped slide member and a locking fitting;

said slide member being slidably entrapped within said rectangular shaped passageway formed along said length of said support bow trackway and having a support bow attachment section extending upwardly from a center top surface of said slide member and slidably positioned through said center slot of said support bow trackway into connection with an end of one of said opposed parallel sections of said U-shaped cover support member;

said locking fitting being attached to said support bow attachment section and extending over said interior upper trackway side;

said locking fitting having a fitting locking aperture provided therethrough that is alignable individually with each of said spaced bow locking apertures of said support bow trackway and securable in fixed relationship therewith by inserting therein one of said number of position locking pins;

said fabric truck bed cover including a bed cover portion and a back flap extending from a center back edge of said bed cover portion;

said bed cover portion having a second plurality of separate support bow receiving sleeves, one of said plurality of separate support bow receiving sleeves having a portion of one of said U-shaped support members of said plurality of identical slidable support bows and said stationary support bow positioned therein to secure said fabric truck bed cover to said variably extendable support frame.

\* \* \* \* \*